(12) United States Patent
Edmark

(10) Patent No.: US 7,038,181 B2
(45) Date of Patent: May 2, 2006

(54) MICROWAVE BEVERAGE AND FOOD PREPARATION APPARATUS

(75) Inventor: John Thomas Edmark, Stanford, CA (US)

(73) Assignee: Megadex Corporation, Stanford, CA (US)

( * ) Notice: Subject to any disclaimer, the term of this patent is extended or adjusted under 35 U.S.C. 154(b) by 0 days.

(21) Appl. No.: 10/850,290

(22) Filed: May 19, 2004

(65) Prior Publication Data

US 2004/0232144 A1 Nov. 25, 2004

Related U.S. Application Data

(60) Provisional application No. 60/472,328, filed on May 21, 2003.

(51) Int. Cl.
*H05B 6/80* (2006.01)
*A47J 27/212* (2006.01)
*B65D 81/34* (2006.01)

(52) U.S. Cl. ............ 219/689; 219/720; 219/734; 219/735; 99/DIG. 14; 426/118; 426/241

(58) Field of Classification Search ........ 219/687–689, 219/725–735, 720; 99/DIG. 14, 344; 426/107, 426/118, 241–243, 234; 126/373–375, 388; 116/67 R, 108
See application file for complete search history.

(56) References Cited

U.S. PATENT DOCUMENTS

| 957,663 | A | 5/1910 | Emslie |
|---|---|---|---|
| 1,092,056 | A | 3/1914 | Jennings |
| 2,049,321 | A | 7/1936 | Sampson |
| 3,326,528 | A | 6/1967 | McIntyre, Jr. |
| 3,724,360 | A * | 4/1973 | Kliewer et al. ............ 99/342 |
| 4,261,328 | A | 4/1981 | Kirk |
| 4,385,585 | A | 5/1983 | Lebowitz |
| 4,466,327 | A | 8/1984 | Hinton |
| 4,529,089 | A * | 7/1985 | Gasbarra et al. ............ 206/525 |
| 4,544,830 | A | 10/1985 | Miller |
| 4,642,443 | A | 2/1987 | Jorgensen et al. |
| 4,645,910 | A | 2/1987 | Chhatwal |
| 4,673,925 | A | 6/1987 | Whiteman |
| 4,692,580 | A | 9/1987 | Bell |
| 4,721,835 | A | 1/1988 | Welker |
| 4,735,191 | A | 4/1988 | Boursse et al. |

(Continued)

FOREIGN PATENT DOCUMENTS

JP   06-2458861   *   9/1994

OTHER PUBLICATIONS

Maarten Rutgers, Physics Inside a Microwave Oven, Internet Web Site: http://home.earthlink.net/~marutgers/fun/microwave/microwave.html; Copyright 1999.*

(Continued)

*Primary Examiner*—Philip H. Leung
(74) *Attorney, Agent, or Firm*—Black Lowe & Graham PLLC

(57) ABSTRACT

A microwave beverage and food preparation apparatus that, in one embodiment, converts a common fluid vessel such as a cup, mug, or bowl into a whistling kettle. A user places a lid having an alarm on a vessel containing liquid to be heated in a microwave. A member made of, or containing, nucleation-site-rich material on the underside of the lid extends into the liquid to activate boiling, thereby assuring a safe transition of the liquid to a normal boiling state. Steam escapes through an integrated whistle in the lid, alerting the user to the boiling.

14 Claims, 15 Drawing Sheets

U.S. PATENT DOCUMENTS

| | | |
|---|---|---|
| 4,751,359 A | 6/1988 | Jamieson |
| 4,900,886 A | 2/1990 | Bridges |
| 4,933,525 A | 6/1990 | St. Phillips |
| 5,038,752 A | 8/1991 | Anson |
| 5,125,068 A | 6/1992 | McNair et al. |
| 5,171,952 A | 12/1992 | Waligorski et al. |
| 5,387,780 A | 2/1995 | Riley |
| 5,671,325 A | 9/1997 | Roberson |
| 5,788,111 A * | 8/1998 | Waugh .................... 220/62.12 |
| 5,902,620 A | 5/1999 | Nolan |
| 5,942,143 A | 8/1999 | Hartman et al. |
| 6,004,000 A * | 12/1999 | Hupf et al. .................. 362/26 |
| 6,175,105 B1 | 1/2001 | Rubbright et al. |
| 6,187,354 B1 * | 2/2001 | Hopkins .................... 426/234 |
| 6,385,585 B1 | 5/2002 | Jonsson et al. |
| 6,403,938 B1 | 6/2002 | Witonsky et al. |
| 2004/0056027 A1 | 3/2004 | Miller |

OTHER PUBLICATIONS

Beaty, W.J., Danger: Coffee Explosion, Unwise Microwave Oven Experiments; http://amasci.com/weird/microexp.html; May 2000.*

* cited by examiner

MICROWAVE BEVERAGE AND FOOD PREPARATION APPARATUS

PRIORITY CLAIM

This application claims the benefit of provisional application Ser. No. 60/472,328, filed May 21, 2003, which is hereby incorporated by reference.

BACKGROUND OF THE INVENTION

This invention relates generally to the field of beverage and food preparation, and, more particularly, to an apparatus that aids in the proper heating of beverages and liquid-foods in a microwave oven. The preferred embodiment is oriented primarily towards beverage preparation in a microwave oven, but the invention described herein could be equally valid when applied to the preparation of foods in a microwave oven.

Microwave ovens are in common use today to prepare hot beverages. Microwave ovens cause the water molecules in the beverage to oscillate and thereby generate heat. One common use of today's microwave ovens is to heat small amounts of water for use in making coffee, tea, or other hot beverages, or for fluid-based foods such as soup and jello. It is quite common for water to be poured into a drinking cup, mug, or bowl, placed in the microwave oven, and brought to a high temperature. Coffee, tea, other beverage matter, or soup mix is then added to this hot water (or the hot water is poured into another food item) and the user drinks directly from the cup, mug, or bowl. It is generally known that the water should be at or very near boiling for maximum flavor extraction of the applied beverage or food ingredients.

Boiling point indication. Microwave ovens often vary in the amount of power they generate, and thus, the degree to which they are able to heat water. One microwave oven may take several minutes to boil a given amount of water that another microwave oven might boil in much less (or more) time. Boiling water in a microwave is thus somewhat a matter of trial and error, whereby the user heats a cup of water for a period of time, tests the temperature by sight (to see if it is bubbling or steaming), by touch, or by taste, and then repeats the heating process if a complete boil has not been reached.

It is also common for people to forget they are heating a vessel of water in a microwave. The heated water cools during this period of forgetfulness. Upon remembering they were preparing a beverage, the user returns to the microwave and re-heats the water. This repetitive re-heating action effectively reduces the flavorful potential of the water by removing dissolved oxygen. Furthermore, this reheating action makes the dangerous act of "superheating" the water more possible (These effects of reheating are both explained in detail later in this section).

Another factor that can vary the amount of time it takes to boil water is simply that the amount of water to be heated can vary. It is quite common for users of microwaves to use a variety of cups, mugs, and bowls, each with different capacities. These varying capacities make it likely that the user will be heating varying amounts of water. Furthermore, it is also quite possible for users to use the same vessel, but having filled it with slightly different amounts of water. Thus, while a user may be using the same microwave oven, the variation in the amount of water being heated at any given instance results in a variation in the amount of time required to boil that water. This variation in time thus, once again, makes boiling water in a microwave an imprecise and inefficient act.

Thus, there exists a need for a device that will conveniently and clearly indicate when a liquid heated in a microwave has reached its boiling point, regardless of the power output of the microwave or the amount of liquid being heated.

Superheating. Microwaves are prone to a scientific phenomenon known as "superheating." Superheating refers to heating of a liquid above its boiling point. Microwaves heat water by being directly absorbed by the water. The microwave energy converts to tumbling of the water molecules, which makes the water hot. When the water boils, molecules of the water rapidly pass from the bulk liquid into vapor bubbles. To make a bubble in the first place, a lot of water has to be moved out of the way, because vapor is much less dense than liquid. The new vapor must push outward against both the internal pressure of the liquid (e.g. water) and the vapor/liquid interface, which provides additional force to collapse the bubble. So, it takes energy and the right combination of molecular motions or the existence of a seed air pocket to form a bubble that can act as a nucleus for boiling. Alternately, an existing pocket of air created by the presence of an imperfection in the vessel surface or by a piece of lint or dust can serve as a suitable seed for a boiling bubble.

Superheating is not a problem with conventional, stove-top heating of liquids. When water is heated in a pot on the stove, the hottest region of the liquid is that right next to the bottom of the pot wall. In addition, the pot walls usually contain many small scratches that hold small bubbles of air, which can act as starters for the boiling process. With the hottest liquid right next to the bubbles that start the boiling, conditions are ideal for boiling to start when water is heated on a stove.

Heating water in vessels commonly-used with microwaves makes boiling more difficult for two reasons. The first is that glasses and glazed ceramic (common materials for cups or other vessels used in microwaves) contain fewer surface scratches than metal pots. This lack of scratches and imperfections provides fewer loci for starter bubbles.

The second reason that water is so commonly superheated in microwaves is that the hottest portion of the liquid is not right next to the vessel surface and its little air bubbles. When water in the middle of the cup is heated to above its boiling point, it is very hard for it to create the bubbles necessary for boiling.

In other words, you will not have boiling water if there are no sites for the vapor (within the liquid) to nucleate (grow) from. Good "nucleation sites" are scratches, irregularities, and other imperfections in the container holding the liquid. Thus, water doesn't always boil when it is heated above its normal boiling temperature (100° C. or 212° F.). Something has to trigger the formation of steam bubbles, a process known as "nucleation." If there is no nucleation of steam bubbles, there will be no boiling and therefore no effective limit to how hot the water can become. If a microwave heats a cup of water beyond the boiling point, the water is said to be "superheated." In practice, a person can heat a cup or mug of water for several minutes and then visually inspect the water to see if it is boiling. If it does not appear to be bubbling and boiling, the user is inclined to heat the water further. In fact, the water may already be at (or above) its boiling point—it just isn't bubbling because there are no nucleation sites. The user then (mistakenly) concludes the water isn't boiling and heats it further, thereby "superheating" it.

Furthermore, the act of heating water to boiling and then allowing it to cool also makes superheating more likely upon reheating. This is because the initial boiling may remove some of the pieces of lint, dust or other catalysts that create seed bubbles for boiling to occur. As stated earlier, it is common for microwave users to begin heating a vessel of water only to forget they are doing so. Upon remembering, the user reheats the water, thereby increasing the relative likelihood of superheating that container of water.

Superheated water is extremely dangerous—all it takes is some trigger to provide a nucleation site to create the first bubble. This trigger could be a spoon inserted into the water, a granule of coffee powder, a teabag, etc., or even simply jarring the vessel. The instant the superheated water receives the nucleation trigger, an explosive eruption of the liquid can occur (as the excess energy is rapidly converted to vapor). The Food and Drug Administration of the United States has received reports of serious burns or scalding injuries around people's hands and faces as a result of extremely hot water erupting out of a cup after it has been superheated in a microwave.

"Superheating" is a common scientific phenomenon that sometimes occurs in the boiling of any liquid. For this reason, it is common practice in laboratory situations to put "boiling chips" or "boiling stones"—pieces of pumice, rock, or other material that provide nucleation sites for boiling to occur—into containers of liquid being boiled.

A related problem is that of "over-boiling" (continuing to boil water after it has reached its boiling point). Over-boiling drives out oxygen dissolved in the water ("cuts" the water) and tends to impart a flat taste to a beverage. It therefore becomes desirable to know just when the water is brought to a boil so that the heating process can be stopped.

Thus, there exists a need to prevent dangerous superheating of water that can occur in microwave ovens. There also exists a related need to prevent over-boiling to maximize the flavorful potential of the beverage liquid.

SUMMARY OF THE INVENTION

In the preferred embodiment, the invention takes the form of a removably attached lid or cap for most common cups, mugs and other vessels used in microwave ovens. The user places the invention on any common drinking vessel and thereby forms an appreciable hermetic seal between the lid and vessel, save for an air channel through an audible apparatus located on the lid. When the liquid reaches its boiling point, pressurized steam is forced to escape through the audible apparatus (it cannot escape elsewhere given the appreciable hermetic seal between the lid and vessel). The venting steam causes the audible apparatus to emit a tone or sound that alerts the user to the fact that the liquid is now boiling.

In the preferred embodiment, the audible apparatus takes the form of a simple, chambered whistle. This whistle is advantageous because it would be cheap to manufacture, is small (reducing the size of the invention), and leverages elemental effects that promise repeatability (which is to say, there's not a lot that can go wrong with the whistle). Alternate embodiments of the invention may feature a different alarm or means (possibly an electric or electronic audible apparatus that is triggered by the steam, pressure, temperature, airflow, temperature-release glues that facilitate the alarm, or other indicators) to notify the user of the presence of boiling water.

In the preferred embodiment of the invention, the whistle has been configured to maximize sound. The placement of the whistle (on x, y, and z axes) on the lid has been found to affect the sound characteristics. It has also been found preferable that the whistle feature a chambered design. This chambered design requires both a low amount of air pressure and a low volume of air passing through it to create an audible sound.

Furthermore, this chambered design is not fouled by the vaporized water passing through it, or by water that may collect into droplets on and in the whistle itself Alternate embodiments of the audible apparatus might employ reeds or other audible devices.

Furthermore, the preferred embodiment of the invention features a pivoting element affixed to the underside of the lid (the side facing the body of water when placed on the cup). This pivoting element folds flat against the underside of the lid when the lid is set down on any substantially flat surface. However, when the preferred embodiment of the invention is set on any typical cup or mug, thus being supported only at its periphery, the pivoting element is now unsupported and is free to drop down under force of gravity.

An alternate embodiment of the invention may employ a fixed stem or otherwise prevent the pivotable member from folding flat against the lid when set on a substantially flat surface. Protruding in this way, the invention would be partially propped up by the stem or pivotable member, which could foster better airflow around the invention to speed drying.

This pivoting element is comprised of—or contains a piece or pieces of—a material (for example, a "boiling stone" or "boiling chip") that fosters the production of nucleation sites in liquids. Thus, when the user sets the invention on a cup or mug containing liquid to be heated, the pivoting element is allowed to drop down and come to rest in the liquid, thereby submerging the boiling stone or chip in the liquid. In this way, the heated liquid is afforded ample nucleation sites for boiling to occur, thus preventing superheating. The nucleation-site-rich pivotable member also fosters an even boiling action, which promotes an even emission of sound from the audible apparatus.

An alternate embodiment of the invention may feature a piece of nucleation-site-rich material attached to the lid by a section of chain or other flexible material. Another alternate embodiment of the invention may feature protruding legs or posts off the underside of the lid. These legs or posts could be made of or contain nucleation-site-rich material that, when submerged in the liquid vessel, would foster proper and safe boiling.

In the preferred embodiment, the invention features two protruding circumferential rims or ridges on its underside (the side facing the mug or cup when in use). These circumferential rims assure the lid will not slide off the beverage vessel. The diameter of the inner circumferential rim is smaller than the interior rim diameter of the smallest vessels in common use for heating microwave beverages; the outer circumferential rim is larger than the exterior rim diameter of the largest vessels in common use for heating microwave beverages.

It may also be advantageous to provide a separate drying tray, rack or other device to place the invention on when not in use. This tray or rack could serve to capture fluid on the invention (such as condensation from the boiling action) and prevent this fluid from contacting and damaging the resting surface. Furthermore, this tray or rack would prevent the invention from being dirtied or otherwise contaminated by the resting surface.

In the preferred embodiment of the invention, gravity is the primary force used to create an appreciable hermetic seal between the lid and the fluid vessel. This use of gravity leverages the fact that most common cups, mugs and bowls have a continuous, flat lip, and allows the user to simply place the lid on the vessel to create the appreciable hermetic seal. In the preferred embodiment, the lid is weighted with lead so that the force of gravity on the lid provides enough resistance to prevent the lid from being lifted off before the steam pressure is forced through the audible apparatus. It should be noted that, contrary to popular misconception, metal objects may be placed safely in a microwave, as long as they are neither thin (which can heat up and burn the user) nor sharp, or pointed (which can cause arcing). An alternate embodiment of the invention may utilize heavy plastic material in the lid itself or weighty material other than metal (e.g. ceramic, sand, etc.).

An alternate embodiment of the invention may feature a more mechanical attachment method (for example, such as that found on common plastic "Tupperware" type container lids) to create the appreciable hermetic seal between the invention and the fluid vessel.

An alternate embodiment of the invention could present the invention as an integral part of a microwaveable food or beverage package to indicate when a certain degree of heating (cooking) has been reached.

Thus, in its preferred form, the invention conveniently and efficiently addresses one or more of the aforementioned needs:

1) to notify the user when a body of liquid (most commonly a cup or mug of water) heated in a microwave oven has reached its boiling point;

2) to prevent over-boiling of this body of liquid; and 3) to prevent the dangerous superheating of the heated liquid.

In the preferred embodiment, the invention takes the form of a removably attached lid or cap for most common cups, mugs or other vessels used in microwave ovens. The user places the invention on any such vessel and thereby forms an appreciable hermetic seal between the lid and vessel, save for an air channel through an audible apparatus located on the lid. When the liquid reaches its boiling point, pressurized steam is forced to escape through the audible apparatus (it cannot escape elsewhere, given the appreciable hermetic seal between the lid and vessel). The venting steam causes the audible apparatus to emit a tone or sound that will alert the user to the fact that the liquid is now boiling. Upon placement of the invention on the vessel, a pivotable member containing nucleation-site-rich material is allowed to drop down into the heated liquid, assuring proper and safe boiling of the liquid.

Accordingly, several advantages of one or more embodiments of the invention are to provide an improved microwave beverage preparation apparatus that can be used on most common cup, mugs, and other vessels typically used to heat beverages in microwaves; to provide an apparatus that audibly indicates when a boiling state of the heating liquid has been reached, and thereby to limit the potential for over-boiling and maximize the flavorful potential of the heating liquid; and to provide an apparatus that submerges a material rich in boiling nucleation sites into the heated liquid to foster proper boiling and prevent dangerous superheating.

BRIEF DESCRIPTION OF THE DRAWINGS

The preferred and alternative embodiments of the present invention are described in detail below with reference to the following drawings.

DETAILED DESCRIPTION OF THE PREFERRED EMBODIMENT

Figure 1:
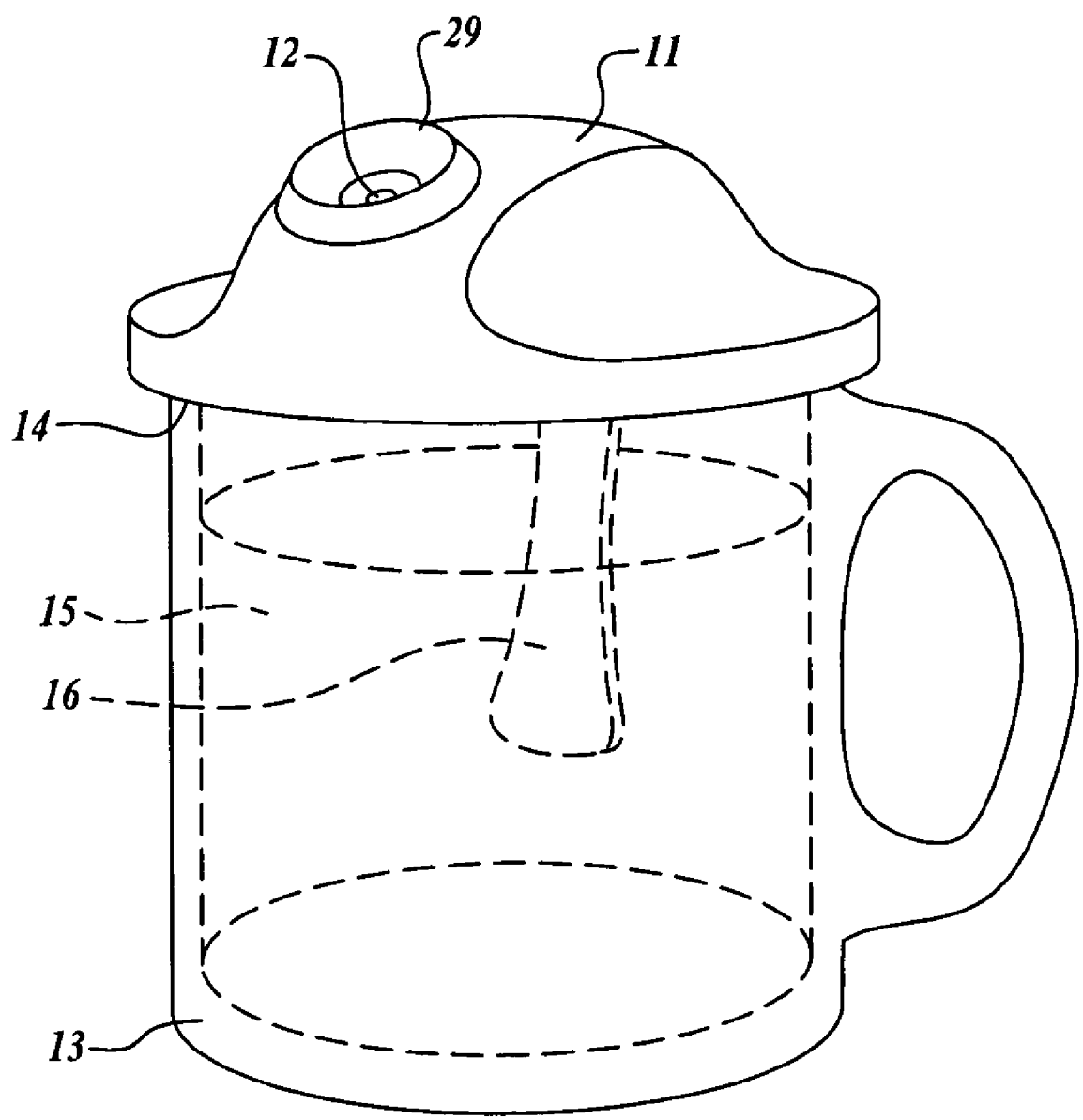
FIG. 1 is a perspective view of a preferred lid in accordance with the invention, set upon a common drinking vessel.

Referring now to FIG. 1, there is shown a preferred embodiment of a microwave beverage preparation apparatus in accordance with the invention. The apparatus includes a lid 11 which may be of plastic, ceramic or any other suitable material, the lid 11 having an audible apparatus 12 affixed therein. The lid 11 is set upon the lip 14 of any common microwave beverage or liquid-food vessel 13 containing liquid 15, preferably water, to be heated. The lid 11 is supported at is periphery by resting on the circular lip 14 of the vessel 13, thereby allowing a pivotable member 16 which has a higher specific gravity (i.e. is heavier) than water to drop down under force of gravity and become partially submerged in the liquid 15. The pivotable member 16 is preferably composed of nucleation-site-rich material such as "boiling stone" formed from pumice or other suitable materials, and thereby serves as a boiling activator. A collar 29 that indicates the location of the audible apparatus 12 is preferably red or otherwise colored to warn the user that steam emits from this spot.

Figure 2:
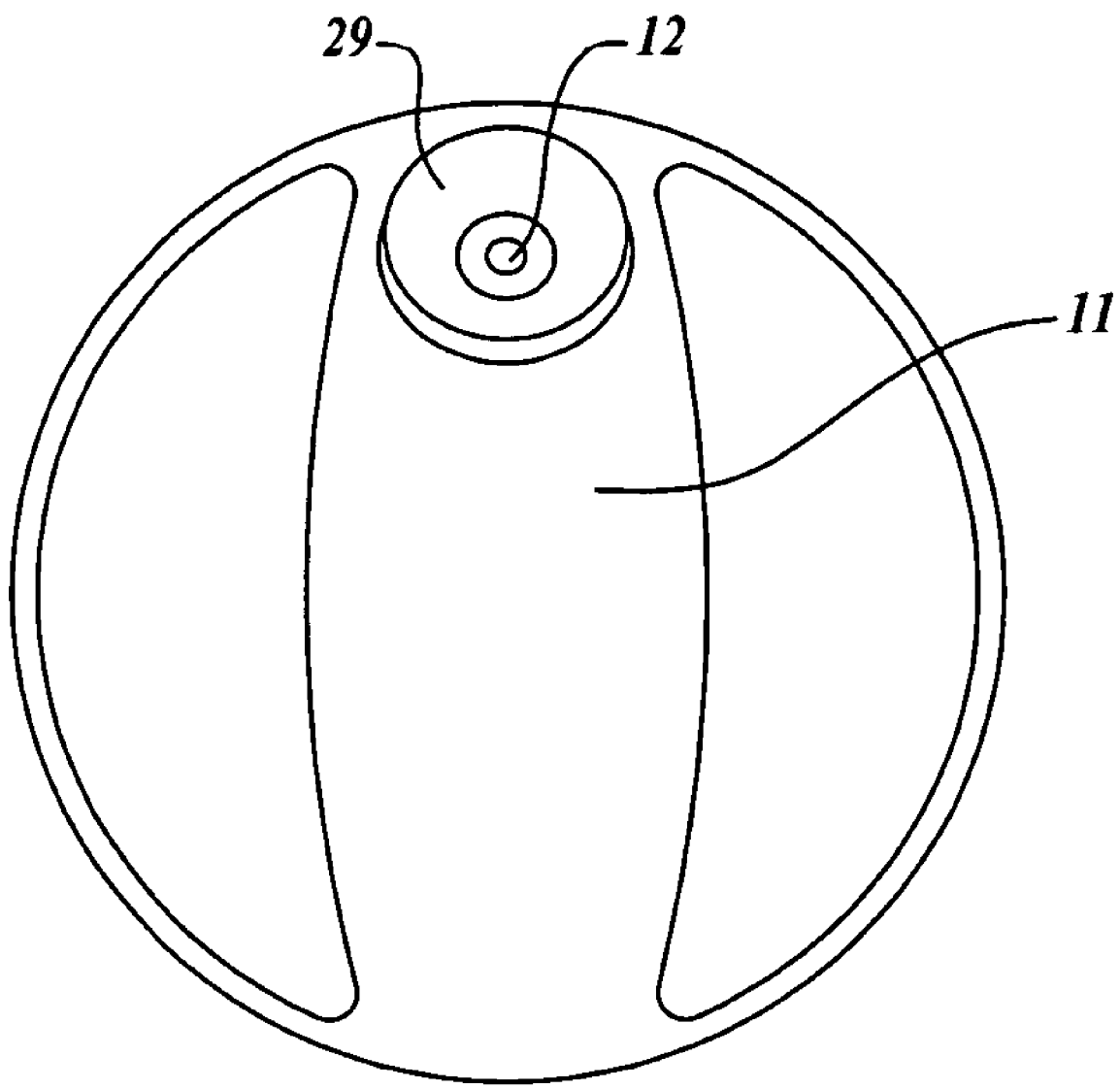
FIG. 2 is a top view of a preferred lid.

FIG. 2 shows a top view of a preferred embodiment of the invention indicating the relative location of the audible apparatus 12 and the collar 29 on the lid 11.

Figure 3:
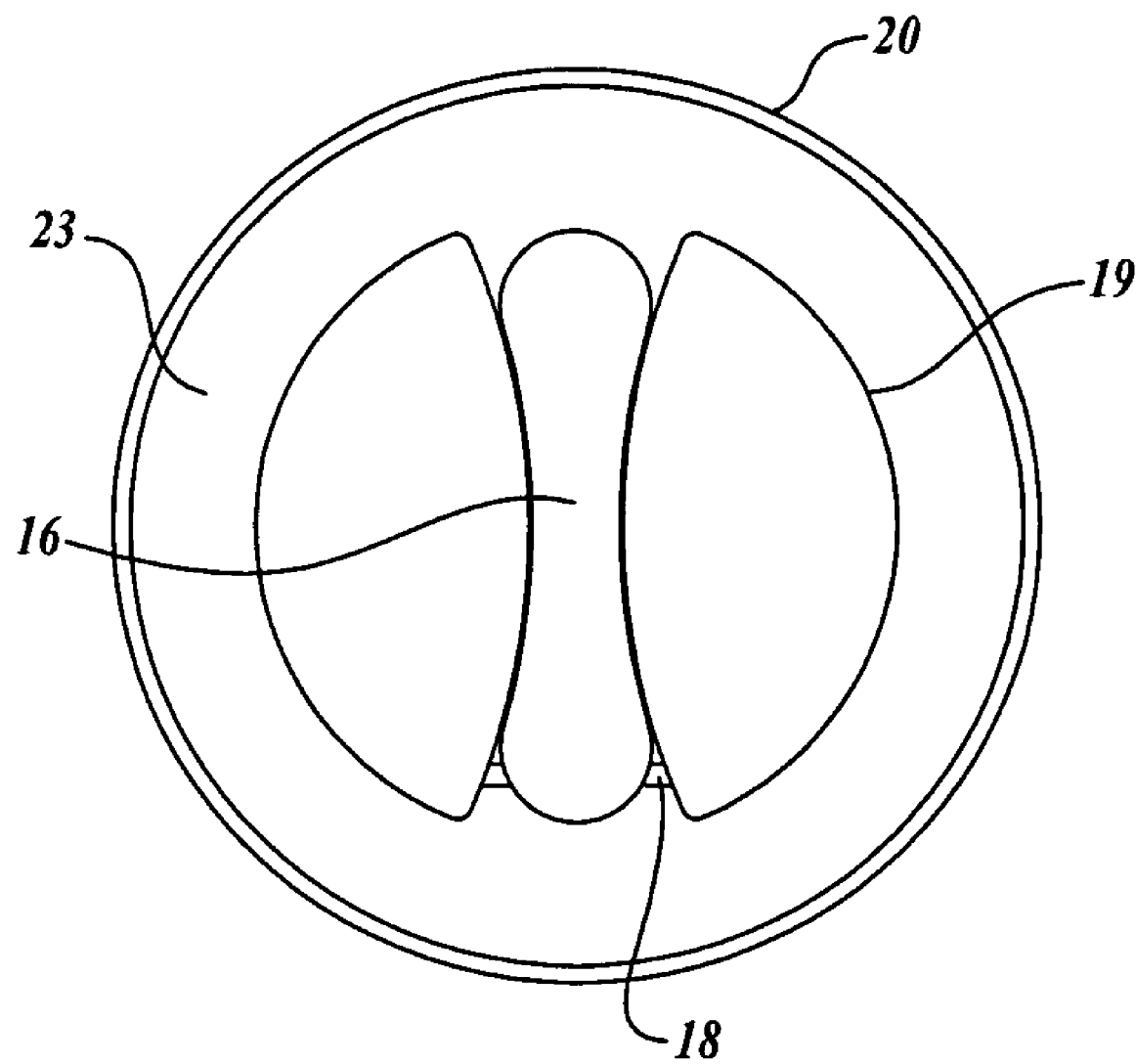
FIG. 3 is an underside view of a preferred lid.

FIG. 3 is an underside view of a preferred embodiment of the invention indicating the pivotable member 16, sealant material 23, inner rim 19, outer rim 20, and hinge 18.

Figure 4:
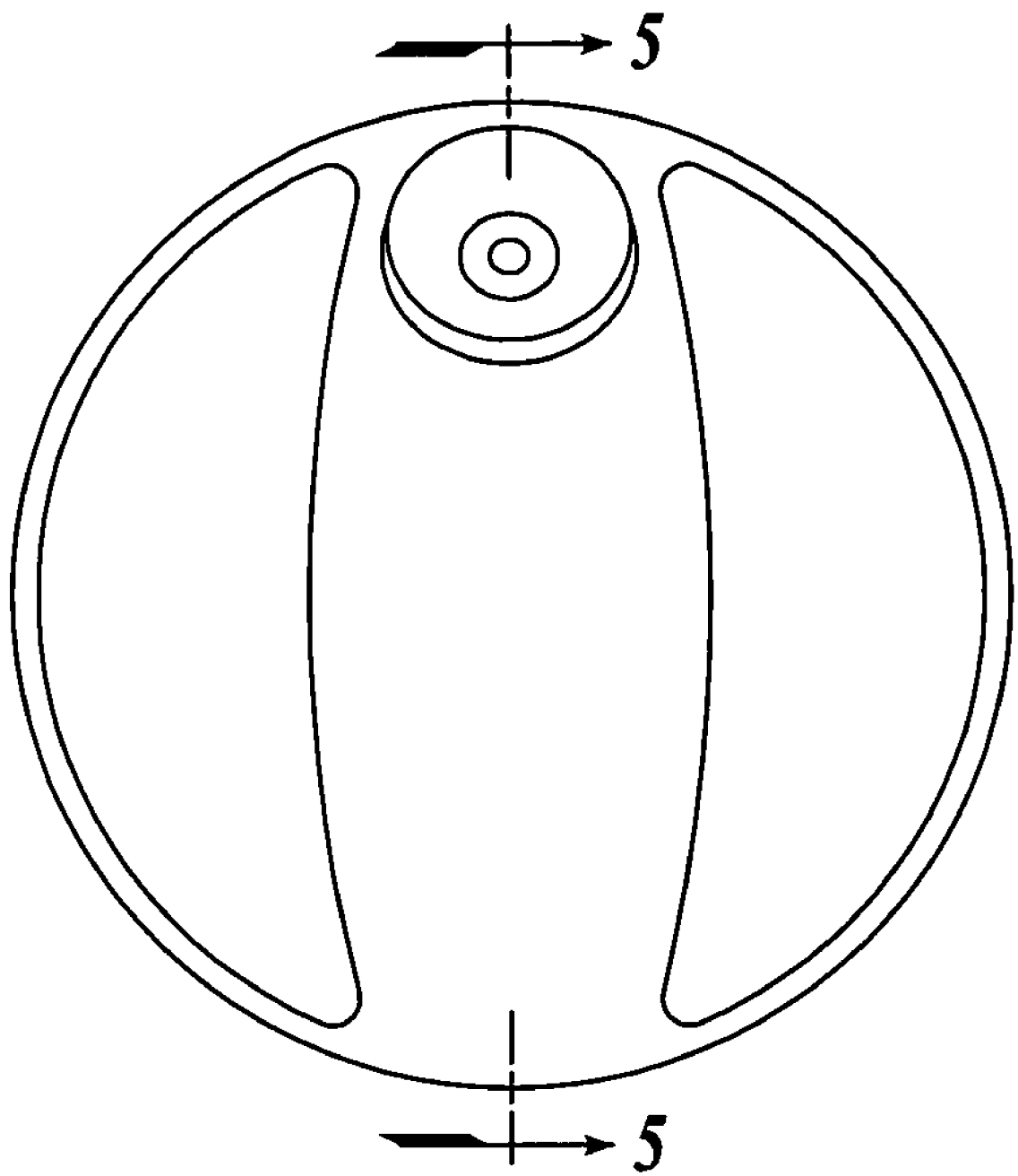
FIG. 4 indicates the plane (midline "5—5") used for the cross-sectional drawing in FIG. 5.
Figure 5:
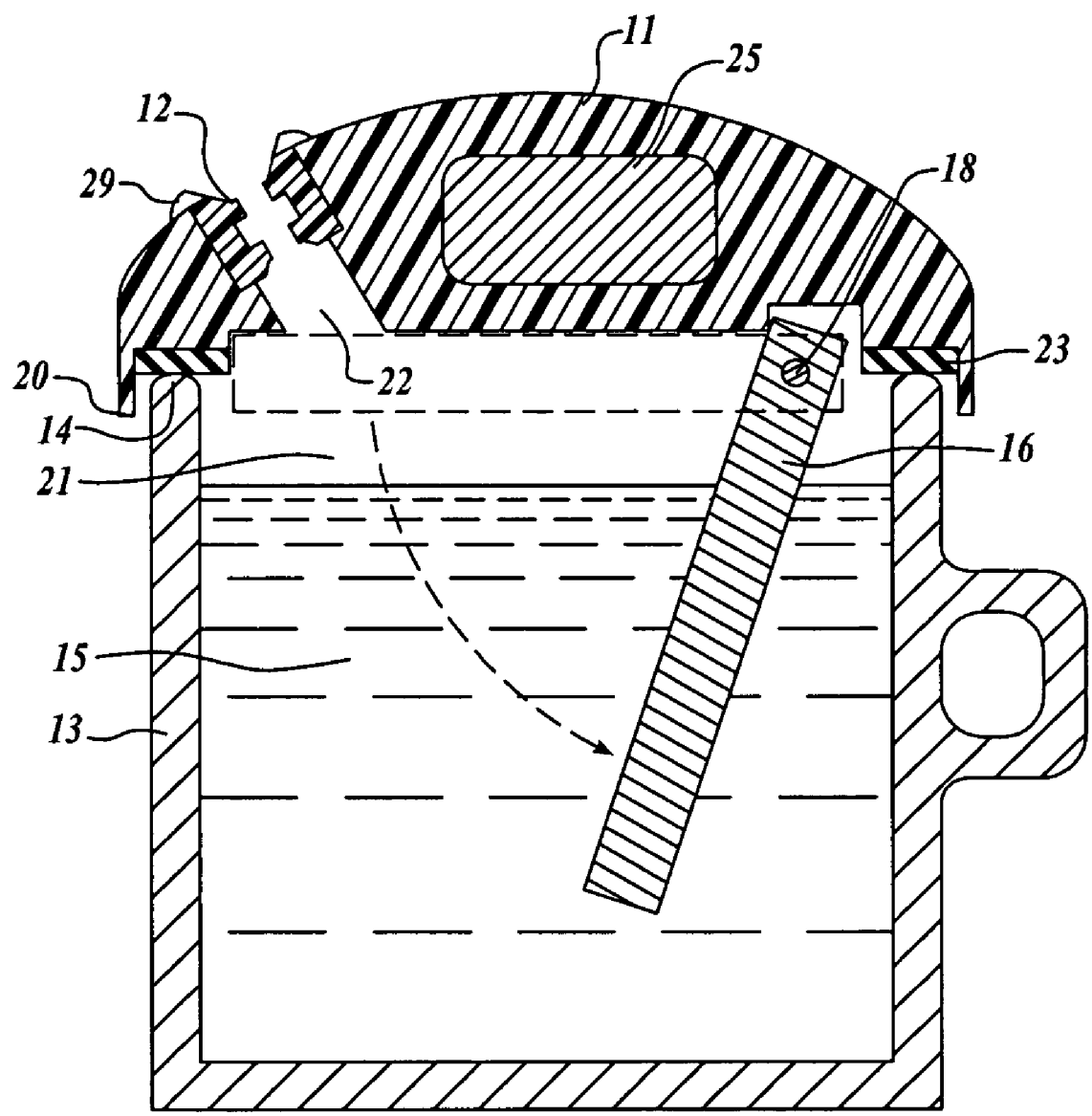
FIG. 5 is a cross-sectional drawing of a preferred lid along midline "5—5" indicated in FIG. 4.

FIG. 4 indicates the midline "5—5" used for the cross-sectional drawing in FIG. 5.

FIG. 5 is a cross-sectional view of a preferred embodiment of the invention along midline "5—5" indicated in FIG. 4. This cross section illustrates the relative location and orientation of the various elements in the preferred embodiment. By force of gravity, the lid 11 rests on the lip 14 of the vessel 13. An annular gasket of silicone or other suitable sealant material 23, being acted upon by the gravitationally-held lid 11, helps create an appreciable hermetic seal between the lip 14 and the lid 11, enclosing a volume of space 21 between the underside of the lid 11 and the surface of the liquid 15 and the liquid 15 itself in the vessel 13. The lid 11 is set to rest on the lip 14 between the lid's inner rim 19 (see FIG. 3) and outer rim 20. Steam pressure generated by the heating action of the microwave on the liquid 15 builds and is forced to escape via the orifice 22 and audible apparatus 12, thereby emitting audible noise. The pivotable member 16 falls under force of gravity to pivot about a hinge 18 and thereby become partially submerged in the liquid 15. The pivotable member 16 is composed of—or contains elements of—material rich in nucleation sites necessary to prevent superheating of the liquid 15.

Figure 6:
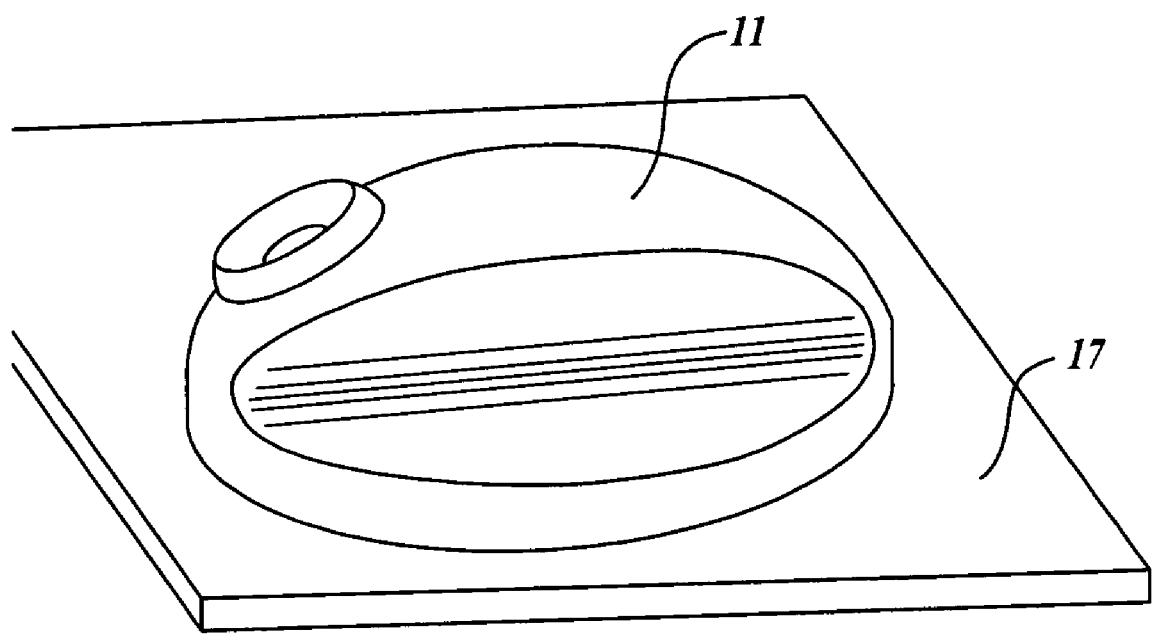
FIG. 6 is a perspective view of a preferred lid resting on a flat surface (with the pivotable member folded in).

FIG. 6 shows the placement of the lid resting on a flat surface 17. Note that in this form the pivotable member is folded into the lid 11, pivoting about the hinge, so that the lid is substantially flat when resting on the flat surface. For that reason, the pivotable member is not visible in FIG. 6.

Figure 7:
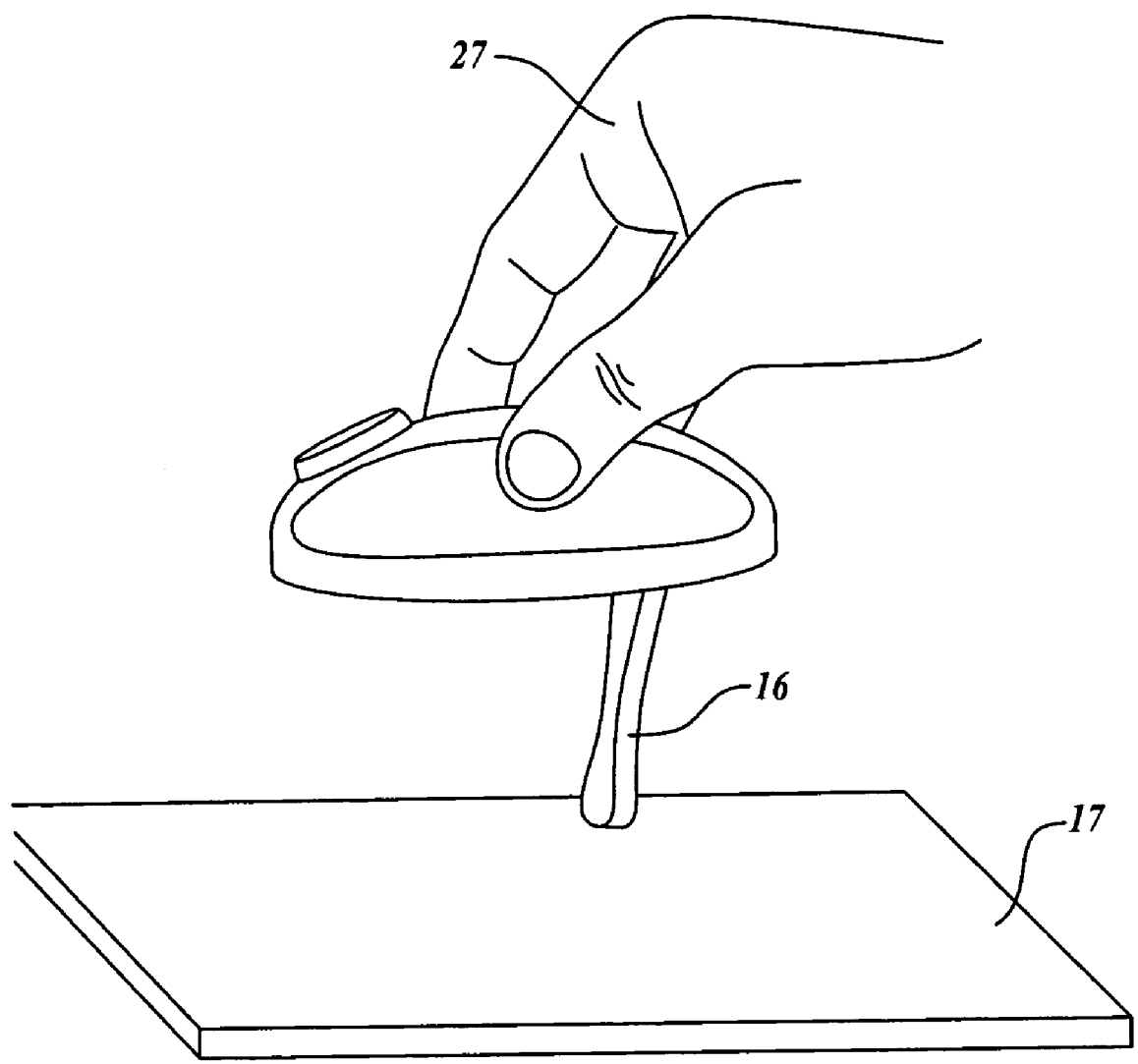
FIG. 7 is a perspective view of a user holding a preferred lid (with the pivotable member folded out) above a flat surface.

FIG. 7 shows a user's hand 27 grasping the lid and holding it over a flat surface 17. Note that the pivotable member 16 hangs down freely under force of gravity.

Figure 8:
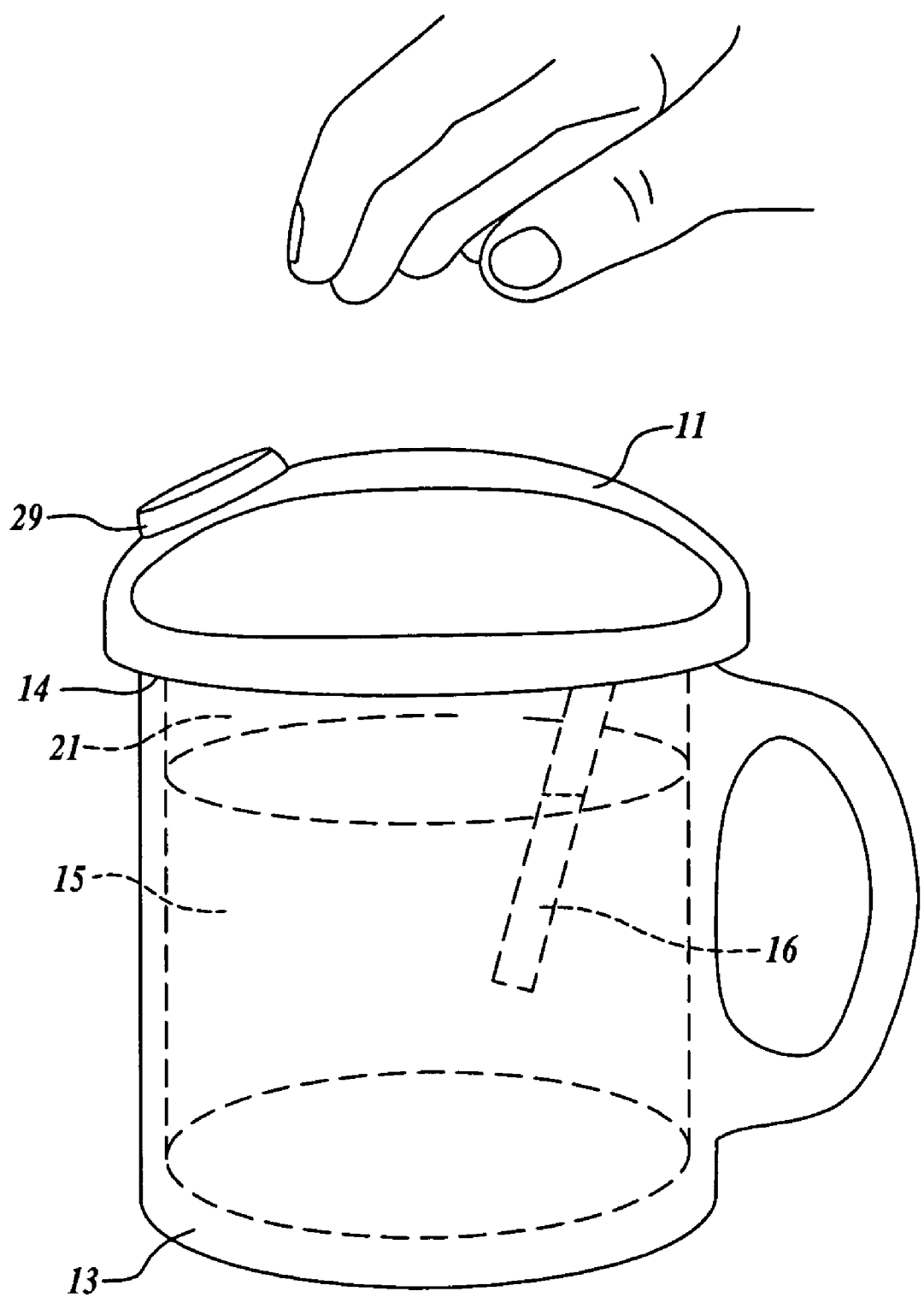
FIG. 8 is a side view of a preferred lid set upon a common drinking vessel, showing the pivotable member dropped down.

FIG. 8 shows the preferred lid placed on a common microwave beverage vessel 13 such as a coffee mug. The lid 11 is supported around its circumferential periphery by the lip 14 of the vessel 13. Resting on the lip 14 of the vessel 13, the lid 11 and its contained weight 25 (see FIG. 5) are acted upon by gravitational force, thus forming an appreciable hermetic seal between the lid 11 and the lip 14. Pressurized steam resulting from microwave heating of the liquid 15 is now only permitted to escape through the audible apparatus 12. Note that the unsupported pivotable member 16 has fallen freely downward by force of gravity, pivoting about the hinge 18. This downward pivoting partially submerges the pivotable member 16 in the liquid 15 contained in the vessel 13.

Figure 9:
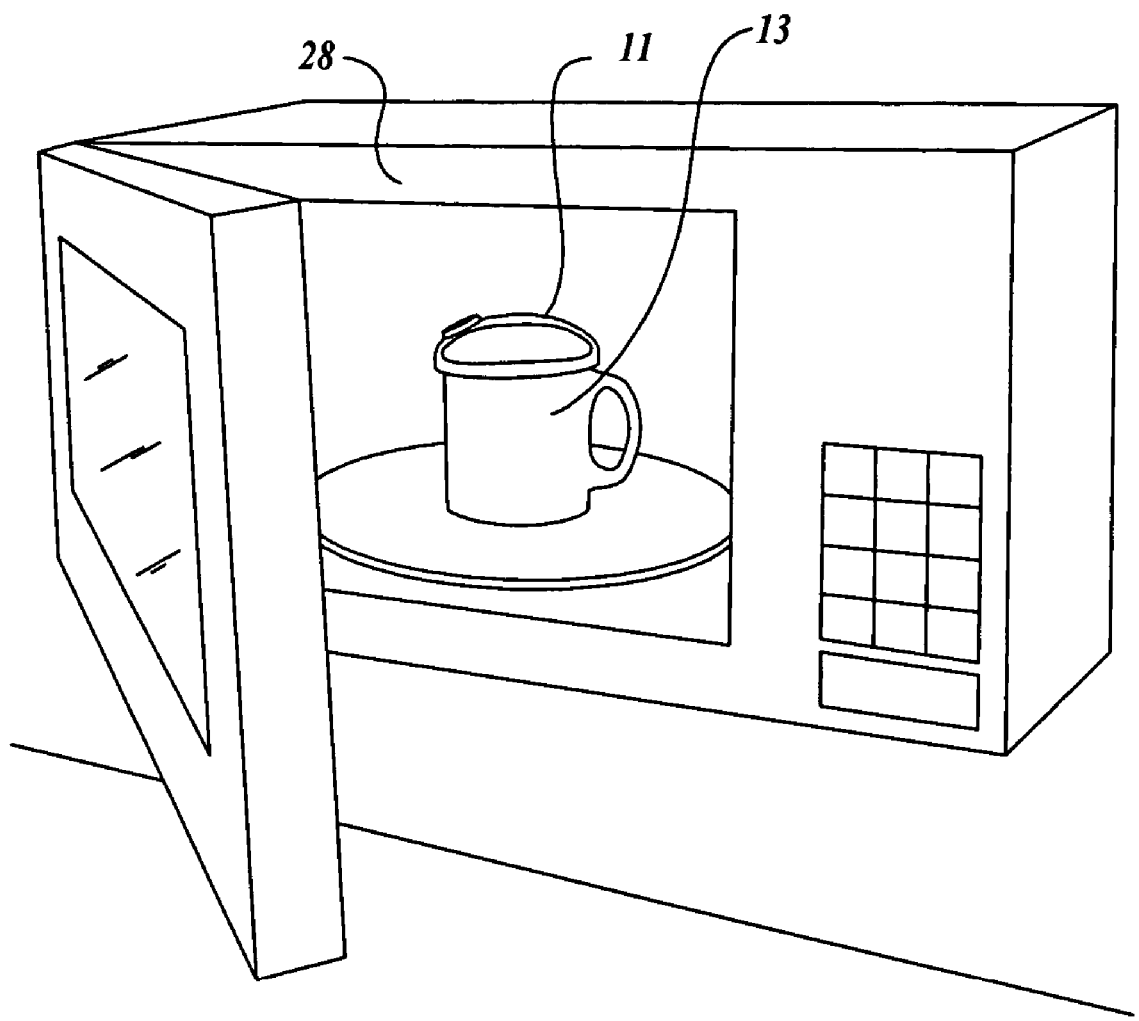
FIG. 9 shows a preferred lid set up a common drinking vessel about to be heated in a microwave oven.

FIG. 9 shows the preferred lid set upon a common drinking vessel 13 and placed in a common microwave oven 28. The heating action of the microwave oven causes the liquid 15 contained in the vessel 13 to be heated. Pressurized steam generated by this heating action is forced to escape through the audible apparatus 12, thereby creating an audible alarm to indicate that boiling of the liquid 15 had been achieved.

Figure 10:
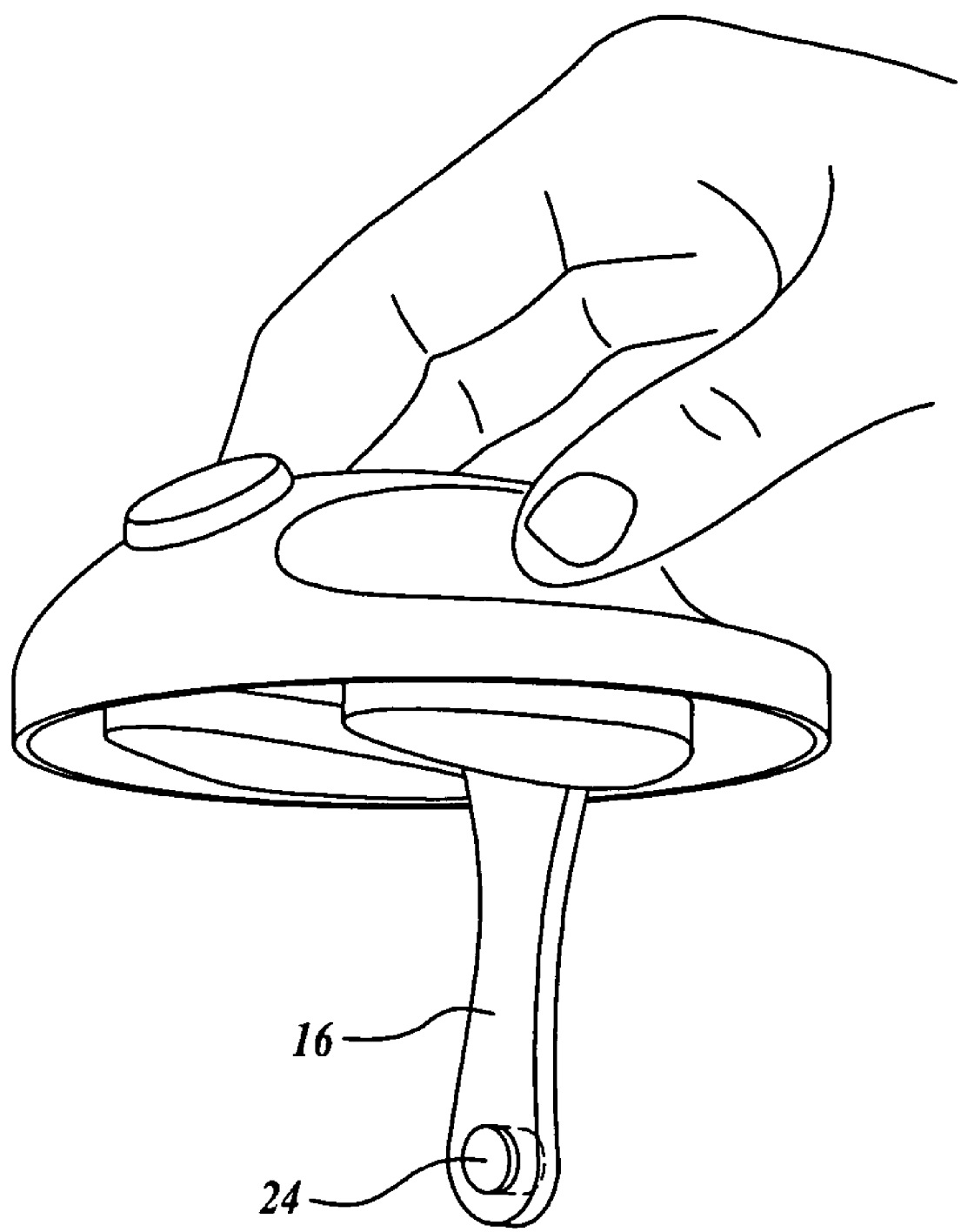
FIG. 10 shows an alternate embodiment of the pivotable member with separate piece of nucleation-site-rich material to be inserted therein.

FIG. 10 shows an alternate embodiment of the invention that features a pivotable member 16 made of plastic, ceramic or other suitable material with a separate nucleation-site-rich material insert 24 fastened thereto.

Figure 11:
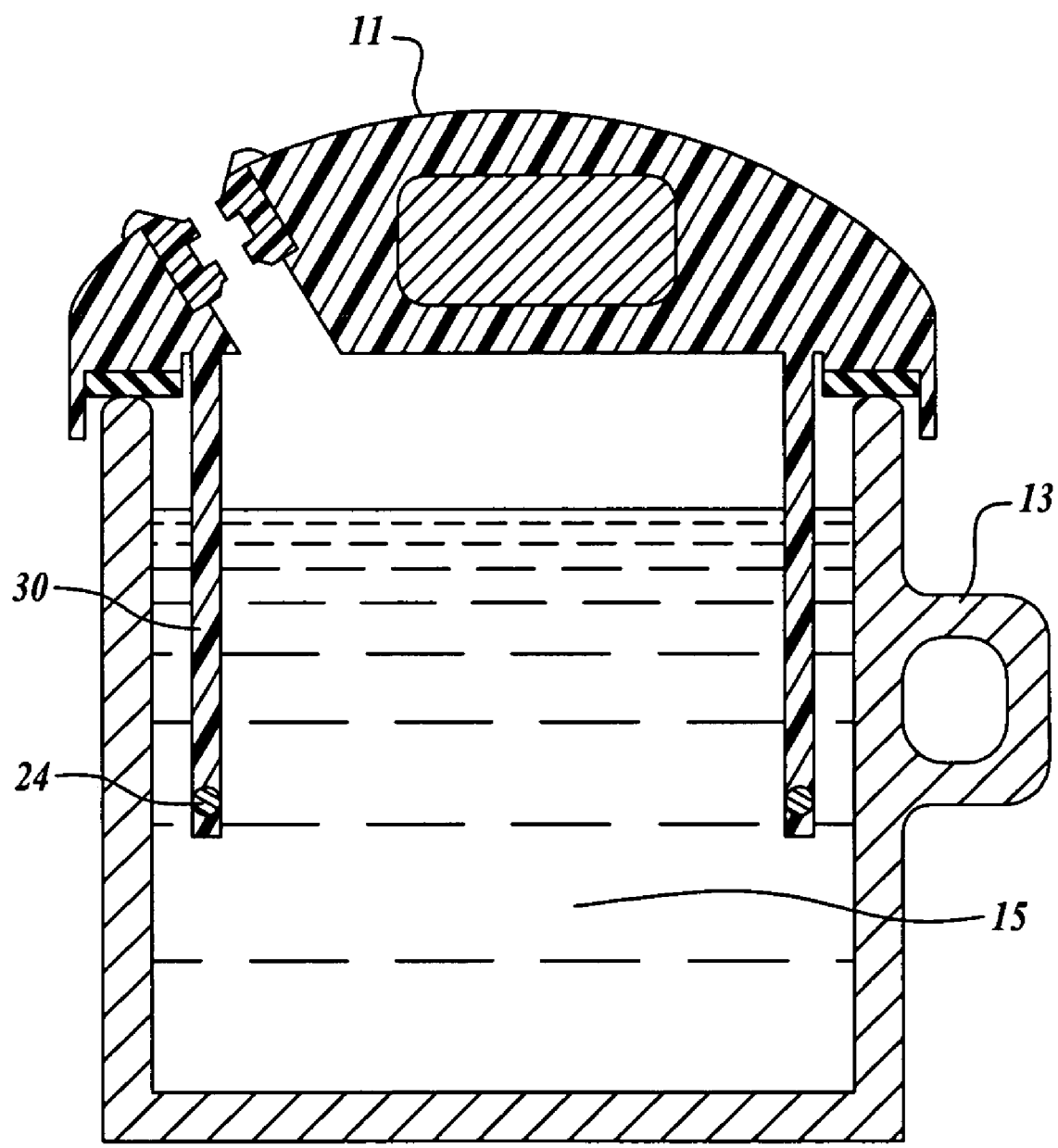
FIG. 11 shows an alternate embodiment of a preferred lid whereby multiple standoffs comprised of or containing nucleation-site-rich material project downward into the vessel's liquid to aid in the proper and safe boiling of the liquid.

FIG. 11 is a cross-sectional view of an alternate embodiment of the invention along midline "5—5" indicated in FIG. 4 whereby multiple legs or standoffs 30 comprised of nucleation-site-rich material or containing a nucleation-site-rich material insert 24 are connected to the lid 11 and project downward therefrom into the liquid 15 contained in the vessel 13 to aid in the proper and safe boiling of the liquid 15. If three are more of these standoffs 30 are employed, the invention would be allowed to stand upright when placed on a surface to accelerate drying.

Figure 12:
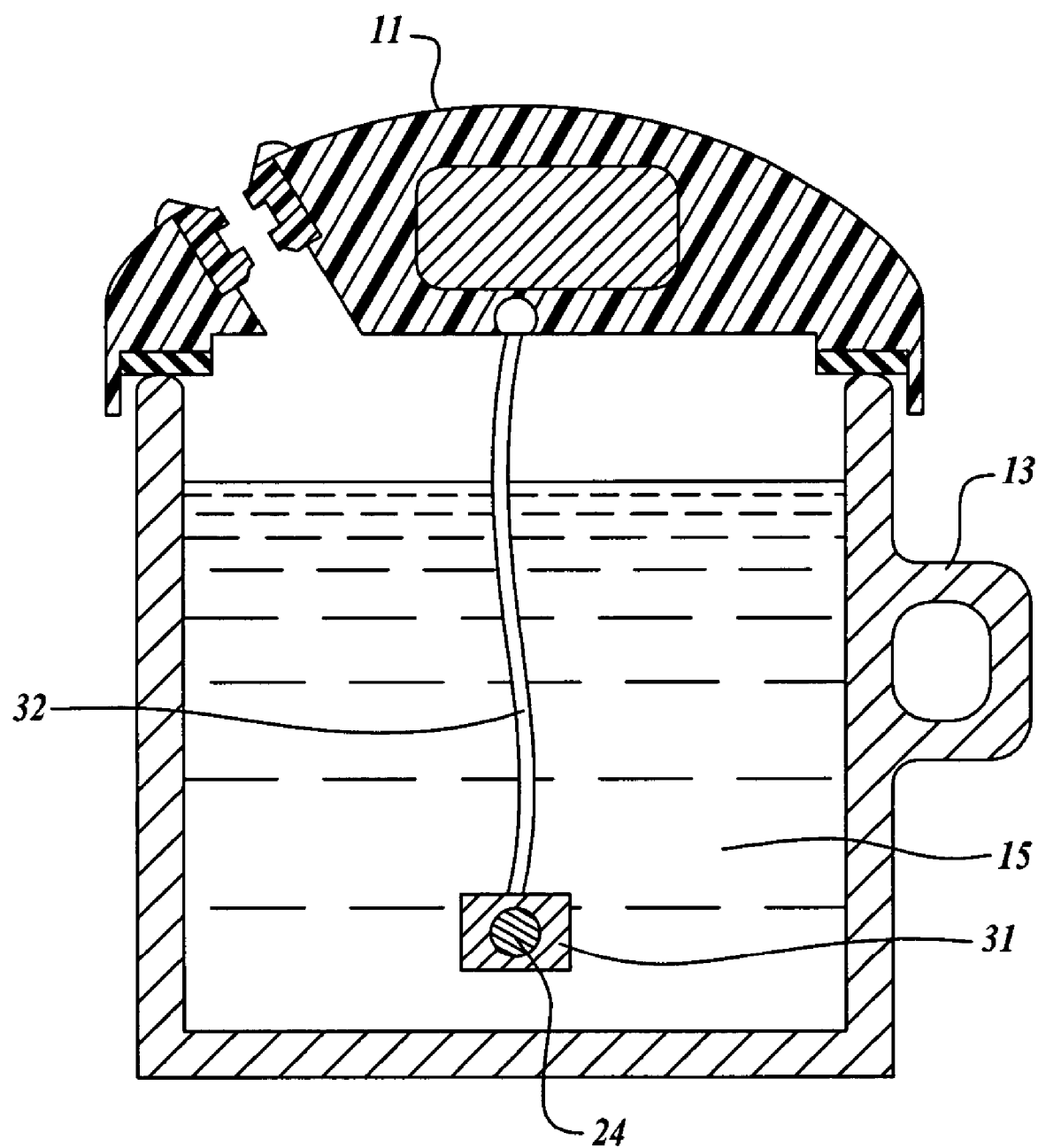
FIG. 12 shows an alternate embodiment of a preferred lid whereby a piece of material comprised of or containing nucleation-site-rich material is attached to a flexible member such that the nucleation-site-rich material is free to hang down into the liquid to aid in the proper and safe boiling of the liquid once the invention is set to rest on the lip of the vessel.

FIG. 12 is a cross-sectional view of an alternate embodiment of the invention along midline "5—5" indicated in FIG. 4 whereby a sinker 31 comprised of nucleation-site-rich material, or formed from ceramic or other materials and containing a nucleation-site-rich material insert 24, is attached to one end of a flexible member 32, the other end of which is attached to the lid 11. The flexible member 32 may be made from string, plastic, rubber, chain, or other materials. Connected thusly, the sinker 31 is free to hang down into the liquid 15 once the lid is set to rest on the lip 14 of the vessel 13, and thereby aid in the proper and safe boiling of the liquid 15.

In the embodiments discussed above, the arrangement includes a lid having a source of nucleation sites depending downwardly from the lid. The source of nucleation sites, however, can be placed in different locations. For example, instead of or in addition to the pivotable member 16, a boiling stick can be attached to the vessel rather than the lid. The boiling stick may be attached to the bottom of the vessel and projecting generally upward, or may be attached to a side of the vessel and extending toward the middle of the vessel.

In yet another embodiment, the vessel walls or interior floor may be configured to provide a source of nucleation sites. This may be accomplished, for example, by forming the interior vessel walls or vessel bottom in such a manner that the surface is somewhat rough, rather than smooth. The rough texture will capture air pockets or small pieces of material that may serve to facilitate boiling. In one form, the vessel may be made from a slightly textured plastic. This embodiment may be combined with a lid having a pivotable member (or other downwardly-depending nucleation source). Glass or ceramic vessels may also be used in this manner by adding a textured surface to all or a portion of the interior of the vessel. In one embodiment, a portion of the interior of the glass vessel is textured in a "scuffed" configuration to provide nucleation sites. In another embodiment, a boiling stone is attached or embedded (preferably permanently) to an interior surface of the glass or ceramic vessel. Thus, for example, the material insert 24 as shown in FIG. 12 is secured to the interior surface (preferably the bottom) of the vessel rather than depending downward from the lid. As another example, a textured sticker is affixed to the bottom of the vessel.

In another alternate embodiment, the lid may be configured for use with a specific vessel. For example, the lid and vessel may together form a typical food or beverage storage container in which the lid forms a substantially air-tight seal. The lid, however, would incorporate the whistle or other alarm as described above. In various versions, the lid or vessel would also include nucleation sites either by having a textured surface or a boil stick.

Figure 13:
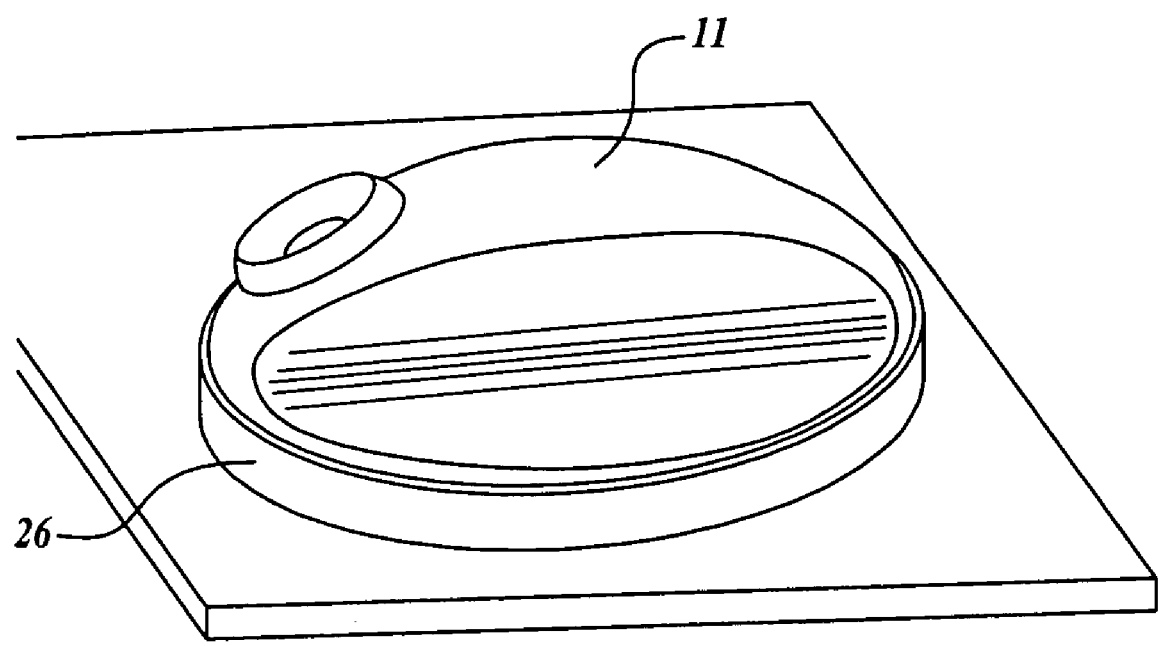
FIG. 13 shows a preferred lid resting in a storage device.

FIG. 13 is a perspective view showing the lid resting in a storage device 26. This storage device 26 would prevent the invention from being dirtied by whatever surface the invention might otherwise be placed on if there were no storage device. Furthermore, the storage device 26 would prevent any moisture that has accumulated on the invention from coming in contact with any surface the invention might otherwise be placed on, thereby protecting that surface from any deleterious effects of the invention's accumulated moisture.

Figure 14:
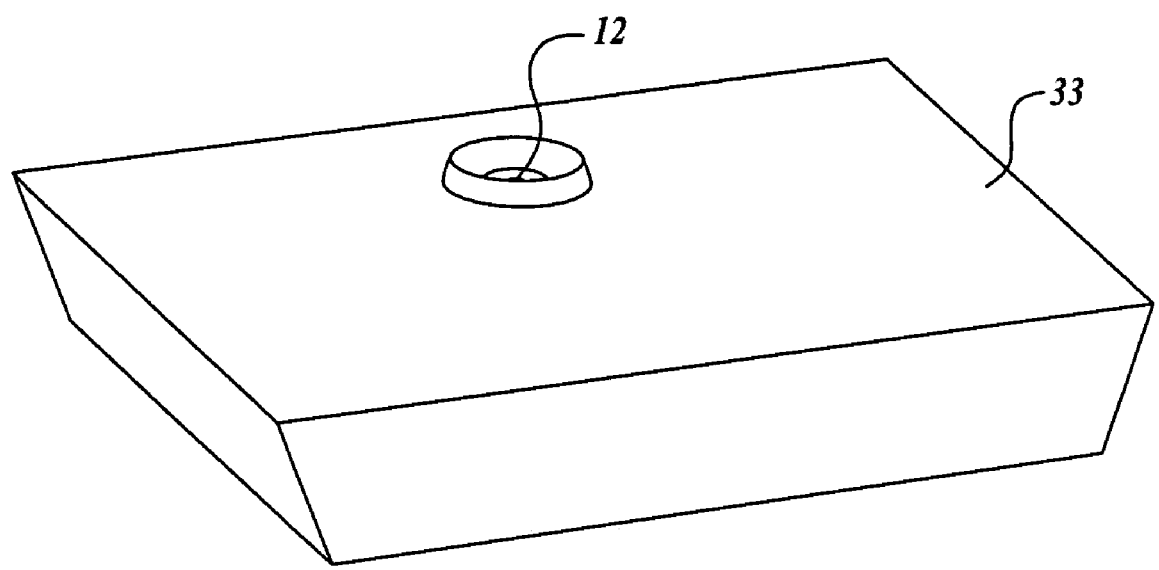
FIG. 14 shows an alternate embodiment of a preferred lid as an integral element of a food package.

FIG. 14 shows an alternate embodiment of the invention as an integral element of a food package 33. In this embodiment, pressurized steam emitted through the audible apparatus 12 would alert the user that a certain degree of heating (cooking) of the packaged food contents has been achieved. It is also possible that a separate chamber of water or ice (distinct from the food itself) could be used to provide a source for the steam pressure to activate the audible apparatus.

Figure 15:
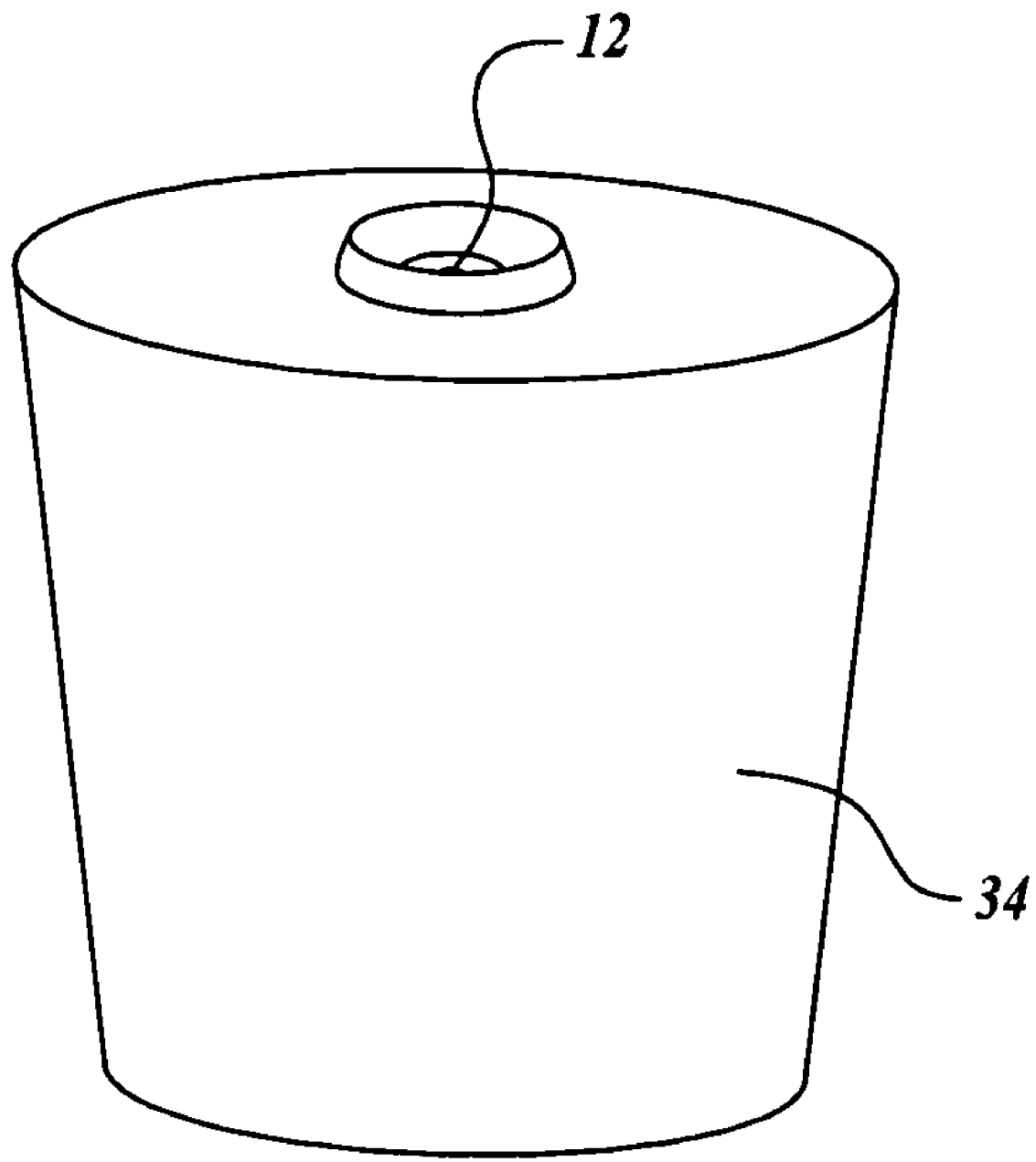
FIG. 15 shows an alternate embodiment of a preferred lid as an integral element of a beverage or liquid-food package.

FIG. 15 shows an alternate embodiment of the invention as an integral element of a beverage/liquid-food package 34. In this embodiment, pressurized steam emitted through the audible apparatus 12 would alert the user that a certain degree of heating (cooking) of the packaged beverage or liquid-food contents has been achieved.

OPERATION OF THE PREFERRED EMBODIMENT

To operate the preferred embodiment of the invention, one places the lid 11 onto the lip 14 of any common drinking vessel 13 filled with liquid 15 that is to be heated in a microwave oven 28. Placement of the lid 11 on the vessel 13 is such that the lip 14 of the vessel 13 is positioned between the inner rim 19 and outer rim 20 of the lid 11. Gravitational force acting on a weight 25 contained in the lid 11 allows the formation of an appreciable hermetic seal between the lid and vessel 13. An area of silicone or other pliable sealant material 23 applied onto the underside of lid 11 between the inner rim 19 and outer rim 20 aids in the sealing effect. The silicone also helps to prevent the lid from sliding around on the vessel when moving the vessel. Because the invention is now supported only by the lip 14 of the vessel 13, the pivotable member 16 falls down under force of gravity, pivoting about hinge 18, thereby partially submerging the pivotable member 16 in liquid 15. The user places the lid as positioned on the vessel 13 in this way into a microwave oven 28 and heats the liquid 15 in a normal fashion. After sufficient microwave energy has transferred to the liquid 15 to cause it to boil, steam pressure generated by the heating of the liquid 15 is forced to escape through the lid orifice 22, and then through the integrated audible apparatus 12. Movement of the steam through the audible apparatus 12 causes an audible sound to be heard (through the microwave oven 28) by the user, thus alerting the user to the present state of boiling. A volume of space 21 between the underside of the lid 11 and the surface of the liquid 15 inhibits the boiling water from bubbling up into the audible apparatus 12, which might foul the noise emitted therewith. The user then can turn off the microwave and remove the vessel 13 and invention. The user can now simply lift the lid off the vessel 13 and prepare a hot beverage in a normal fashion. The lid may be placed onto a flat surface 17 or storage device 26 to allow the lid to dry.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The invention claimed is:

1. A food preparation apparatus, comprising:
   a lid having an upper side and a lower side;
   a whistle alarm attached to the lid; and
   a boiling activator attached to the lid and extendable beneath the lower side of the lid, the activator comprising a stem pivotally connected to the lower side of the lid.

2. The apparatus of claim 1, wherein the stem is formed from a material relatively rich in nucleation sites.

3. The apparatus of claim 1, further comprising a material attached to the stem, the material being relatively rich in nucleation sites.

4. The apparatus of claim 1, wherein the stem is pivotable between a first position adjacent the lower side of the lid and a second position extending away from the lower side of the lid, and further wherein the lid is capable of resting substantially flat on a flat surface when the stem is in the first position.

5. The apparatus of claim 4, wherein the pivotal connection of the stem is such that when the lid is in an upright position and no external force urges the stem toward the lower side of the lid, the stem is in the second position.

6. The apparatus of claim 1, wherein the whistle comprises a chambered whistle.

7. The apparatus of claim 1, further comprising one or more ridges protruding from the lower side of the lid, the one or more ridges being configured to secure the lid to a cup.

8. The apparatus of claim 1, further comprising a gasket attached to the lower side of the lid.

9. The apparatus of claim 1, further comprising a weight secured to lid.

10. The apparatus of claim 1, further comprising a cup, the lid being removably placed atop the cup.

11. A food preparation apparatus, comprising:
    a lid having an upper side and a lower side;
    a whistle attached to the lid; and
    a boiling activator attached to the lid and extendable beneath the lower side of the lid, the activator comprising
    a flexible extension member having a first end and a second end, the first end attached to the lid and the second end attached to a sinker, the sinker having a specific gravity greater than that of water.

12. The apparatus of claim 11, wherein the sinker is formed from a material relatively rich in nucleation sites.

13. The apparatus of claim 11, further comprising a material attached to the sinker, the material being relatively rich in nucleation sites.

14. The apparatus of claim 11, wherein the lid forms a seal between the lid and the cup so that when steam is generated by a liquid heated within the cup, the steam escapes through the whistle, causing the whistle to emit an audible noise.

* * * * *